United States Patent
Lee et al.

(10) Patent No.: US 11,424,438 B2
(45) Date of Patent: Aug. 23, 2022

(54) CATHODE ACTIVE MATERIAL FOR LITHIUM SECONDARY BATTERY, CATHODE AND LITHIUM SECONDARY BATTERY COMPRISING SAME, AND MANUFACTURING METHOD THEREOF

(71) Applicants: Hyundai Motor Company, Seoul (KR); Kia Motors Corporation, Seoul (KR)

(72) Inventors: Jieun Lee, Hwaseong-si (KR); Yeolmae Yeo, Anseong-si (KR); Seung-Min Oh, Incheon (KR); Sang Mok Park, Gwangju-si (KR); Yoon Sung Lee, Suwon-si (KR); Dongjun Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 322 days.

(21) Appl. No.: 16/576,290

(22) Filed: Sep. 19, 2019

(65) Prior Publication Data

US 2020/0194774 A1    Jun. 18, 2020

(30) Foreign Application Priority Data

Dec. 18, 2018  (KR) .......................... 10-2018-0163802

(51) Int. Cl.
| | |
|---|---|
| H01M 4/00 | (2006.01) |
| H01M 4/131 | (2010.01) |
| H01M 4/1391 | (2010.01) |
| H01M 10/052 | (2010.01) |
| H01M 4/525 | (2010.01) |
| H01M 4/485 | (2010.01) |

(52) U.S. Cl.
CPC ......... *H01M 4/131* (2013.01); *H01M 4/1391* (2013.01); *H01M 4/485* (2013.01); *H01M 4/525* (2013.01); *H01M 10/052* (2013.01)

(58) Field of Classification Search
CPC .... H01M 4/131; H01M 4/1391; H01M 4/485; H01M 4/525; H01M 10/052; H01M 2004/028; H01M 4/0471; H01M 4/624; H01M 4/366; H01M 4/505; H01M 4/62; H01M 4/362; Y02E 60/10; C01B 32/921; C01G 53/50; C01P 2004/80
See application file for complete search history.

(56) References Cited

U.S. PATENT DOCUMENTS

| | | | | |
|---|---|---|---|---|
| 10,305,100 | B2 * | 5/2019 | Kim | ...................... H01M 4/364 |
| 2012/0326079 | A1 * | 12/2012 | Kim | .................... H01M 4/0471 |
| | | | | 252/182.1 |
| 2017/0338471 | A1 * | 11/2017 | Zheng | .................. H01M 4/505 |

* cited by examiner

*Primary Examiner* — Nicholas P D'Aniello
(74) *Attorney, Agent, or Firm* — Morgan, Lewis & Bockius LLP

(57) ABSTRACT

A cathode active material for a lithium secondary battery, the cathode method including a core including a lithium metal oxide and a coating layer disposed on the surface and the inner grain boundaries of the core, wherein the coating layer includes a metal carbide, and a method of manufacturing the same.

18 Claims, 14 Drawing Sheets

CATHODE ACTIVE MATERIAL FOR LITHIUM SECONDARY BATTERY, CATHODE AND LITHIUM SECONDARY BATTERY COMPRISING SAME, AND MANUFACTURING METHOD THEREOF

This application claims the benefit of priority to Korean Patent Application No. 10-2018-0163802 filed on Dec. 18, 2018 in the Korean Intellectual Property Office, the entire disclosure of which is incorporated herein by reference.

BACKGROUND

The present disclosure relates to a cathode active material for a lithium secondary battery, a cathode and a lithium secondary battery each including the same, and a method of manufacturing the same. More particularly, the present disclosure relates to a cathode active material for a lithium secondary battery capable of preventing the lifetime of the lithium secondary battery from deteriorating, a cathode and a lithium secondary battery each including the same, and a method of manufacturing the same.

Up to now, surface modification of a cathode active material has been mainly based on water-based coating using distilled water and a solvent. However, a cathode active material having a high nickel content is vulnerable to moisture and deteriorates in distilled water and other solvents. Therefore, it is difficult to apply a conventional water-based coating to surface modification of a cathode active material having a high nickel content.

The cathode active material having a high nickel content used for a high capacity lithium secondary battery has a problem causing side reaction with the electrolyte accordance with $Ni^{4+}$ present on the surface of the cathode active material and sudden change of the lattice according to the phase change during the charging/discharging.

In order to solve this, there has been a method of coating the cathode active material with a stable material on the surface in the form of island. However, sudden change of the lattice occurred in the charging/discharging process causes cracks in the crystal. As a result, there is still a problem that the electrolyte penetrates into the particles, causing deterioration of the inner grain boundaries, resulting in rapid deterioration of the lifetime characteristics.

Therefore, it is required to improve the lifetime characteristics of the cathode active material having a high nickel content by suppressing side reactions with the electrolyte penetrating into the grain boundaries and cracks.

In order to solve the above problems, the present disclosure provides a cathode active material for a lithium secondary battery having improved lifetime characteristics by suppressing side reactions with an electrolyte penetrating along grain boundaries and cracks of the cathode active material, a cathode and a lithium secondary battery each including the same, and a manufacturing method thereof.

SUMMARY

A cathode active material for a lithium secondary battery according to an embodiment of the present disclosure may include a core including a lithium metal oxide and a coating layer disposed on the surface and inner grain boundaries of the core, and the coating layer may include a metal carbide.

Also, the metal carbide may include a carbide of at least one metal selected from a group consisting of nickel (Ni), cobalt (Co), titanium (Ti), iron (Fe), manganese (Mn), vanadium (V), copper (Cu), zirconium (Zr), zinc (Zn), aluminum (Al), arsenic (As), molybdenum (Mo) and tungsten (W).

Also, the metal carbide may be contained in the coating layer in an amount of 0.5 to 2 mol %.

Also, the lithium metal oxide may be represented by a formula selected from a group consisting of $Li_xMn_{1-y}M'_yA_2$, $Li_xMn_{1-y}M'_yO_{2-z}X_z$, $Li_xMn_2O_{4-z}X_z$, $Li_xMn_{2-y}M'_yA_4$, $Li_xCo_{1-y}M'_yA_2$, $Li_xCo_{1-y}M'_yO_{2-z}X_z$, $Li_xNi_{1-y}M'_yA_2$, $Li_xNi_{1-y}M'_yO_{2-z}X_z$, $Li_xNi_{1-y}Co_yO_{2-z}X_z$, $Li_xNi_{1-y-z}Co_yM'_zA_\alpha$, $Li_xNi_{1-y-z}Co_yM'_zO_{2-\alpha}X_\alpha$, $Li_xNi_{1-y-z}Mn_yM'_zA_\alpha$, and $Li_xNi_{1-y-z}Mn_yM'_zO_{2-\alpha}X_\alpha$ (where $0.95 \leq x \leq 1.1$, $0 \leq y \leq 0.5$, $0 \leq z \leq 0.5$, and $0 < \alpha \leq 2$), wherein, M' is at least one element selected from a group consisting of aluminum (Al), nickel (Ni), cobalt (Co), manganese (Mn), chromium (Cr), iron (Fe), magnesium (Mg), strontium (Sr), vanadium (V), ruthenium (Ru), tin (Sn), titanium (Ti), arsenic (As), molybdenum (Mo) and a rare earth element, A is an element selected from a group consisting of oxygen (O), fluorine (F), sulfur (S) and phosphorus (P), and X is an element selected from a group consisting of fluorine (F), sulfur (S) and phosphorus (P).

A lithium secondary battery according to another embodiment of the present disclosure may include a cathode including a cathode active material including a core including a lithium metal oxide and a coating layer formed on a surface and inner boundaries of the core, wherein the coating layer includes a metal carbide, an anode and an electrolyte.

A method of manufacturing a cathode active material for a lithium secondary battery according to another embodiment of the present disclosure may include dry mixing a metal carbide with a core including a lithium metal oxide to prepare a mixture and forming a metal carbide coating layer on a surface and inner grain boundaries of the core by heating the mixture.

Also, the dry mixing may include at least one selected from a group consisting of a planetary ball mill method, a low speed ball mill method, a high speed ball mill method, a hybridization method and a mechanofusion method.

Also, the metal carbide may be contained in an amount of 0.5 to 2 mol %.

Also, a temperature for the heating may be 600 to 700° C.

According to an embodiment of the present disclosure, a coating layer may be formed on the core by dry coating.

In addition, the coating layer is formed not only on the surface of the core but also on the inner grain boundaries of the core to suppress side reactions between the cathode active material and the electrolyte, thereby improving lifetime characteristics of a battery.

DETAILED DESCRIPTION

Figure 1:
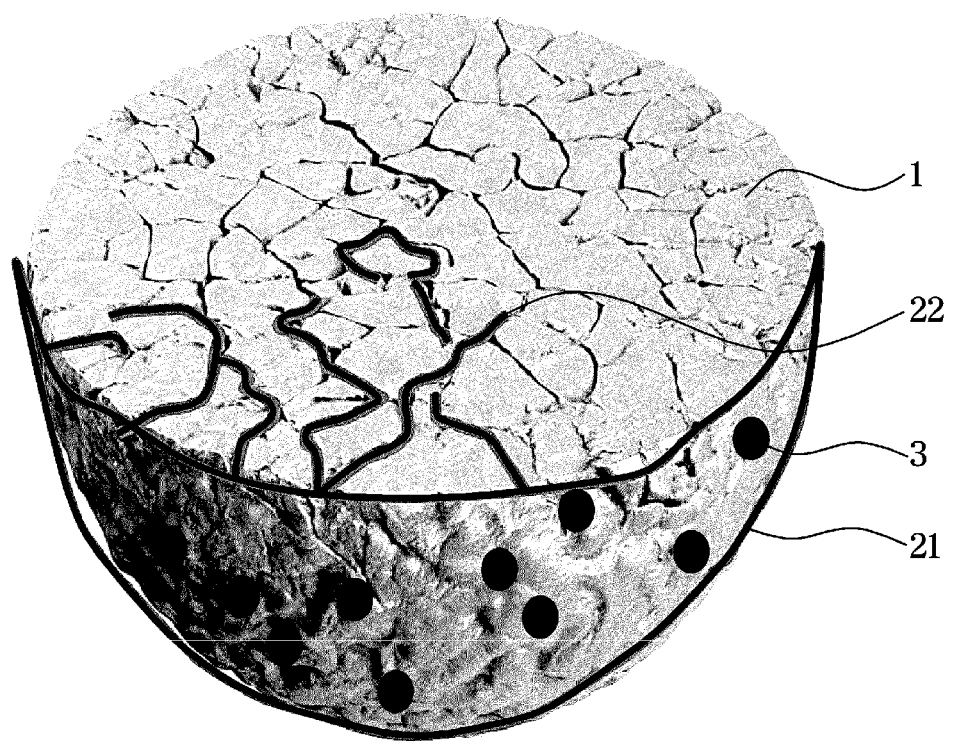
FIG. 1 is a schematic view of a cathode active material for a lithium secondary battery according to an embodiment of the present disclosure.

A cathode active material for lithium secondary battery according to an embodiment of the present disclosure may include a core including a lithium metal oxide and a coating layer formed on the surface and inner grain boundaries of the core, and the coating layer may include a metal carbide Hereinafter, preferred embodiments of the present disclosure will be described. However, the embodiments of the present disclosure may be modified into various other forms, and the technical idea of the present disclosure is not limited to the embodiments described below. Further, the embodiments of the present disclosure are provided to more fully explain the present disclosure to those skilled in the art.

The terms used in the present application are used only to illustrate specific examples. Thus, for example, the expression of the singular includes plural expressions unless the context clearly dictates otherwise. In addition, the terms "include" or "have," and the like used in the present application are used to specifically denote the presence of stated features, steps, functions, elements, or combinations thereof and the like, and are not used to preparatorily preclude the presence of elements, steps, functions, components, or combinations thereof.

Unless defined otherwise, all terms used herein should be interpreted to have the same meaning as commonly understood by one of ordinary skill in the art to which the present disclosure belongs. Thus, unless explicitly defined herein, certain terms should not be construed in an overly ideal or formal sense.

It should also be understood that the terms "about," "substantially," and the like in the present specification are used in the numerical value or in the vicinity of the numerical value in the meanings mentioned when inherent manufacturing and material allowable errors are presented, and are used to prevent conscienceless intruders from unreasonably using the accurate or absolute numbers, disclosed in the present disclosure to help understanding of the present disclosure Since a cathode active material having a high nickel content is vulnerable to moisture and deteriorates in distilled water and other solvents, it is difficult to apply a conventional water-based coating to surface modification of the cathode active material having a high nickel content.

Also, the cathode active material having a high nickel content used for a high capacity lithium secondary battery has a problem of side reaction with an electrolyte due to highly reactive $Ni^{4+}$ present on the surface of the cathode active material and sudden change of the lattice caused by phase changes during charging/discharging.

In order to solve the above problems, the present disclosure provides a cathode active material for a lithium secondary battery having improved lifetime characteristics by suppressing side reactions with an electrolyte penetrating along the grain boundaries and cracks of the cathode active material, a cathode and a lithium secondary battery each including the same and a manufacturing method thereof.

The cathode active material according to one embodiment of the present disclosure may include a core including a lithium metal oxide and a coating layer formed on the surface and inner grain boundaries of the core, and the coating layer may include a metal carbide.

Hereinafter, embodiments of the present disclosure will be described in detail with reference to the accompanying drawings. Referring to FIG. 1, a lithium metal oxide-containing core 1, a coating layer 21 formed on a surface of the core 1, and a coating layer 22 formed on the inner grain boundaries of the core 1, which are included in a cathode active material for a lithium secondary battery according to an embodiment of the present disclosure, are shown. Hereinafter, each component will be described.

Core

In the present disclosure, the core is a constitution in which lithium is reversibly intercalated and deintercalated by charging/discharging, and is a main component of the cathode active material of the present disclosure.

The core of the present disclosure may include a lithium metal oxide. The lithium metal oxide includes lithium and an oxide of a metal including lithium. For example, the lithium metal oxide comprises at least one compound represented by a formula selected from a group consisting of $Li_xMn_{1-y}M'_yA_2$, $Li_xMn_{1-y}M'_yO_{2-z}X_z$, $Li_xMn_2O_{4-z}X_z$, $Li_xMn_{2-y}M'_yA_4$, $Li_xCo_{1-y}M'_yA_2$, $Li_xCo_{1-y}M'_yO_{2-z}X_z$, $Li_xNi_{1-y}M'_yA_2$, $Li_xNi_{1-y}M'_yO_{2-z}X_z$, $Li_xNi_{1-y-z}Co_yO_{2-z}X_z$, $Li_xNi_{1-y-z}Co_yM'_zA_\alpha$, $Li_xNi_{1-y-z}Co_yM'_zO_{2-\alpha}X_\alpha$, $Li_xNi_{1-y-z}Mn_yM'_zA_\alpha$, and $Li_xNi_{1-y-z}Mn_yM'_zO_{2-\alpha}X_\alpha$ (where $0.955 \leq x \leq 1.1$, $0 \leq y \leq 0.5$, $0 \leq z \leq 0.5$, and $0 < \alpha \leq 2$). M' is at least one element selected from a group consisting of Al, Ni, Co, Mn, Cr, Fe, Mg, Sr, V, Ru, Sn, Ti, As, Mo and a rare earth element, A is an element selected from a group consisting of O, F, S and P, and X is an element selected from a group consisting of F, S and P.

The core has a problem of side reaction with the electrolyte due to highly reactive $Ni^{4+}$ present on the surface of the cathode active material and sudden change of the lattice caused by phase changes during charging/discharging. Accordingly, in the present disclosure, a coating layer is formed on the surface and the inner grain boundaries of the core, thereby preventing the electrolyte from contacting the surface by the coating layer formed on the core surface and preventing the electrolyte from penetrating into the core through cracks caused by abrupt changes of the inner lattice of the core during the repetitive charging/discharging processes. Thus, it is possible to prevent the side reaction between the core and the electrolyte. Hereinafter, the coating layer which is a constitution for suppressing the side reaction between the core and the electrolyte will be described.

Coating Layer

In the present disclosure, the coating layer, as a constitution suppressing side reactions between the core and the electrolyte, is formed on the surface and the inner grain boundaries of the core, thereby suppressing side reactions with HF generated during charging/discharging and securing the structural stability of the cathode material.

Since a metal oxide has a high melting point, it is difficult to form a coating layer of the metal oxide on the surface and the inner grain boundaries and the coating process cannot be performed by a dry process, and thus the moisture vulnerability of the cathode active material for a lithium secondary battery cannot be complemented and a metal halide is difficult to manufacture and low in stability. Thus, according to one example, the coating layer of the present disclosure may include a metal carbide. The type of the metal is not particularly limited as long as the metal carbide according to an exemplary embodiment of the present disclosure has no problem in terms of electrochemical characteristics. As one embodiment of the present disclosure, the metal may include at least one metal selected from a group consisting of Ni, Co, Ti, Fe, Mn, V, Cu, Zr, Zn, Al, As, Mo and W.

When the coating layer is formed of a carbide of Ti or V among the metals, resistance to side reactions with the electrolyte is increased as compared with other metals, and capacity reduction and structural deformation due to the side reactions are reduced. Therefore, the coating layer of the present disclosure preferably contains at least one selected from a group consisting of Ti and V.

According to one example, the metal carbide of the present disclosure may be contained in the coating layer in an amount of 0.5 to 2 mol %. When the content of the metal carbide is less than 0.5 mol %, a coated area becomes narrow and the side reaction between the core and the electrolyte may not be sufficiently suppressed. When the amount of the metal carbide exceeds 2 mol %, the reversible intercalation and deintercalation of lithium may be hindered, and the effect of suppressing the side reaction by the coating layer is saturated.

More preferably, the metal carbide of the present disclosure may be contained in the coating layer in an amount of 1 mol %. In the above molar percentage (mol %) range, it is possible to perform reversible intercalation and deintercalation of lithium smoothly while sufficiently suppressing the side reaction between the core and the electrolyte, thereby improving lifetime characteristics of the battery.

As described above, the coating layer in the present disclosure may effectively suppress the side reaction between the core and the electrolyte, thereby ensuring excellent lifetime characteristics of the battery.

Cathode Active Material

The cathode active material for a lithium secondary battery according to an embodiment of the present disclosure may include a core including a lithium metal oxide and a coating layer formed on the surface and the inner grain boundaries of the core, wherein the coating layer may include a metal carbide.

Referring to FIG. 1, the cathode active material according to an embodiment of the present disclosure will be described. The cathode active material according to an embodiment of the present disclosure may include a coating layer 21 formed on the surface of the core 1 in which lithium is reversibly intercalated and deintercalated upon charging and discharging, and a coating layer 22 formed on the inner grain boundaries, to prevent infiltration of the electrolyte, thereby suppressing the side reaction between the core 1 and the electrolyte. At this time, the coating layer 22 is formed on the inner grain boundaries of the core by penetration of the metal carbide through the pores 3 of the core 1.

Accordingly, the cathode active material of the present disclosure may effectively suppress the side reaction between the core and the electrolyte by forming a coating layer on both the surface and the inner grain boundaries of the core, thereby securing excellent lifetime characteristics of the cell.

Cathode for Lithium Secondary Battery and Lithium Secondary Battery

A cathode for a lithium secondary battery according to an exemplary embodiment of the present disclosure is not particularly limited as long as the cathode includes the cathode active material. In addition, any configuration changeable by any person skilled in the art may be included in the lithium secondary battery of the present disclosure, and the description thereof will be omitted.

Hereinafter, a method of manufacturing a cathode active material for a lithium secondary battery according to an embodiment of the present disclosure will be described in detail.

A method of manufacturing a cathode active material for a lithium secondary battery according to an embodiment of the present disclosure may include dry mixing metal carbide with a core including lithium metal oxide to prepare a mixture and forming a metal carbide coating layer on a surface and inner grain boundaries of the core by heating the mixture. Each step will be described in detail below.

Dry Mixing Metal Carbide with Core Including Lithium Metal Oxide

According to an embodiment of the present disclosure, the dry mixing of the metal carbide with the core including the lithium metal oxide is a step of forming a coating layer of the metal carbide on the surface of the core by dry mixing the metal carbide with the core including the lithium metal oxide. The core and the metal carbide have been described above and descriptions thereof will be omitted.

In the present disclosure, the step of dry mixing the metal carbide with the core including the lithium metal oxide is not particularly limited as long as a coating layer is formed on the surface of the core by mixing the core and the metal carbide. However, because a cathode active material having a high nickel content is vulnerable to moisture, surface modification with water-based aqueous coating is difficult. Therefore, the dry mixing is preferably used in the present disclosure.

According to an embodiment of the present disclosure, the dry mixing may include at least one selected from a group consisting of a planetary ball mill method, a low speed ball mill method, a high speed ball mill method, a hybridization method and a mechanofusion method.

In the mechanofusion method, the mixture is charged into a rotating container, and the mixture is fixed to the inner wall of the container by a centrifugal force, and then compressed into a gap between the inner wall of the container and an adjacent arm head at a slight interval.

According to an embodiment of the present disclosure, the mechanofusion method may be preferably used as a dry mixing method. According the mechanofusion method, mixing may be performed at a higher speed than other dry mixing methods, and a uniform coating may be formed on the surface of the core. Also, since no balls or blades are used, the metal carbide may be coated on the surface of the core without breaking the core or damaging the surface.

In the mechanofusion method according to an embodiment of the present disclosure, the metal carbide is attached to the surface of the core to bond the core to the metal carbide, and at the same time, the metal carbide of the surface of the core is mechanically bonded by the stress accompanying the metal carbide to form a coating layer. Further, the coating layer formed of the metal carbide on the surface of the core may be softened or melted and bonded by heat generated from the accompanying stress.

The method may further include heat-treating the mixture, after dry mixing the metal carbide with the core to form the metal carbide coating layer on the surface of the core. By the heat-treating, the previously formed coating layer may be further strengthened and the metal carbide may be diffused into the core to form a coating layer on the inner grain boundaries and cracks of the core. Hereinafter, the heat-treating will be described in detail.

Forming Metal Carbide Coating Layer on Surface and Inner Grain Boundaries of Core by Heating Mixture The heat-treating of the metal carbide coating layer to form the coating layer on the surface and the inner grain boundaries of the core according to an embodiment of the present disclosure is the step of further strengthening the coating layer which is already formed on the surface of the core by dry mixing the metal carbide with the core, and forming a coating layer on the inner grain boundaries of the core and the cracks by heating the metal carbide to diffuse in a partially or entirely molten state.

The heating conditions in this step may be any conditions that may melt a part of or the entire coating layer and are not particularly limited. However, it is preferable that the heating conditions do not exceed an initial firing temperature of the core, more preferably 600 to 700° C.

In this step, the coating layer is formed not only on the outer surface of the core but also on inner grain boundaries of the core by the metal carbide diffused to the inner grain boundaries of the core to prevent the electrolyte from penetrating into cracks in the core, thereby suppressing side reactions between the core and the electrolyte. This makes it possible to secure excellent lifetime characteristics of the cell.

Hereinafter, the present disclosure will be described more specifically by way of examples. It should be noted, however, that the following examples are intended to illustrate the present disclosure in more detail and not to limit the scope of the present disclosure. The scope of the present disclosure is determined by the matters set forth in the claims and the matters reasonably inferred therefrom.

EXAMPLES

Hereinafter, the manufacturing process of each of the examples and comparative examples will be described, and the examples and comparative examples will be compared and evaluated with reference to the accompanying drawings.

Preparation of Example 1

A core (Li[Ni$_{0.53}$Co$_{0.10}$Mn$_{0.07}$]O$_2$) and 1 mol % titanium carbide (TiC) were subjected to hand mixing in a dry room with limited humidity and temperature using a Mortar Grinder. At this time, the coating raw material was dispersed first in the outer wall of the Mortar Grinder, and the cathode active material was added later. Hand mixing was carried out with care to minimize active material damage (particle breakage) for 15 to 20 minutes using the Mortar Grinder. Thereafter, the active material was transferred to a bottle of polypropylene (PP) material and then ball milled using four zirconia balls having a diameter of 5 mm and ten zirconia balls having a diameter of 2 mm. At this time, the milling was performed at a speed of 100 rpm for 1 hour. Then, an intermediate was obtained, and heating was carried out at 650° C. for 5 hours using a crucible made of alumina. At this time, the cathode active material for lithium secondary battery of Example 1 was prepared by performing the heat treatment in a high-purity oxygen atmosphere and setting a temperature increase rate and a temperature decrease rate were to ±2° C./min.

Preparation of Example 2

A cathode active material for a lithium secondary battery was prepared in the same manner as in Example 1, except that the amount of titanium carbide (TiC) was changed to 0.5 mol %.

Preparation of Example 3

A cathode active material for a lithium secondary battery was prepared in the same manner as in Example 1, except that the amount of titanium carbide (TiC) was changed to 2 mol %.

Preparation of Comparative Example 1

In Comparative Example 1, a cathode active material for a lithium secondary battery was prepared using only a core (Li[Ni$_{0.83}$Co$_{0.10}$Mn$_{0.07}$]O$_2$) without forming a coating layer.

Preparation of Comparative Example 2

A cathode active material for a lithium secondary battery was prepared in the same manner as in Example 1, except that titanium oxide (TiO$_2$) was used instead of titanium carbide (TiC).

Preparation of Comparative Example 3

A cathode active material for a lithium secondary battery was prepared in the same manner as in Example 1, except that the amount of titanium carbide (TiC) was changed to 5 mol %.

Preparation of Comparative Example 4

A cathode active material for a lithium secondary battery was prepared in the same manner as in Example 1, except that the heating was carried out at 400° C.

<Evaluation>

(1) Formation of Coating Layer

Figure 2A:
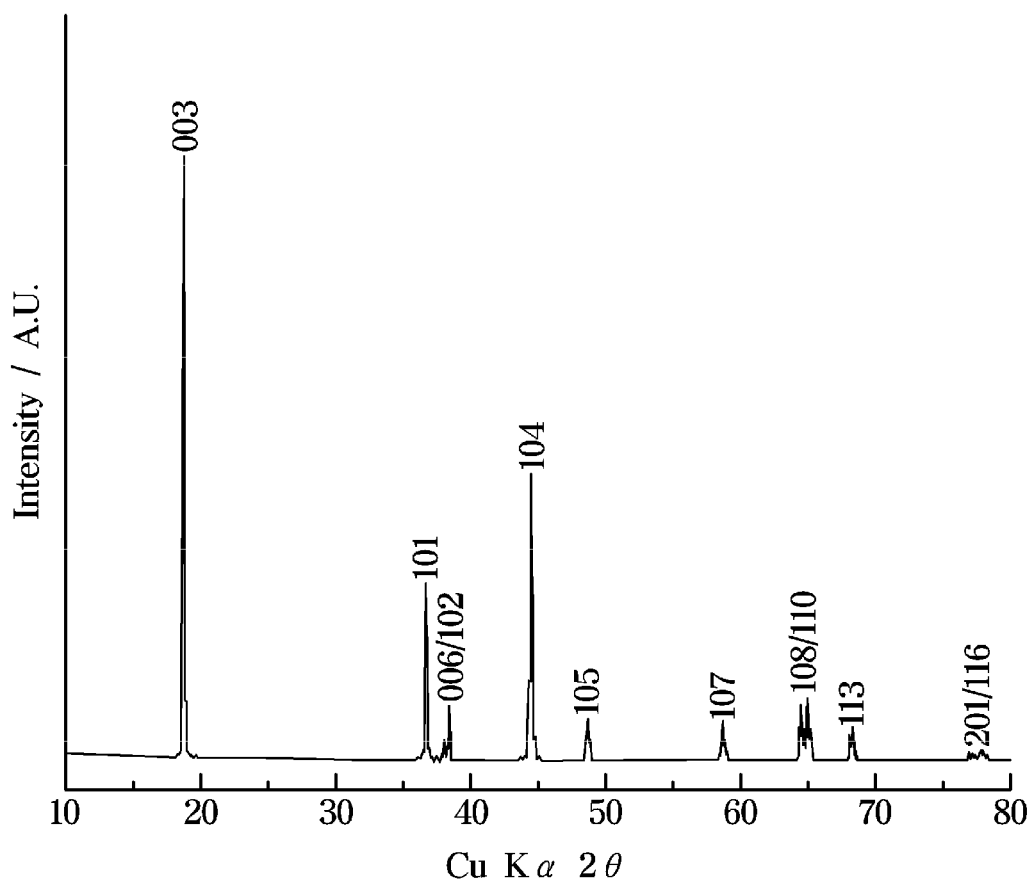
FIGS. 2A, 2B and 2C are x-ray diffraction (XRD) graphs of cathode active materials for lithium secondary batteries according to Comparative Example 1, Example 1 and Comparative Example 3, respectively.
Figure 2B:
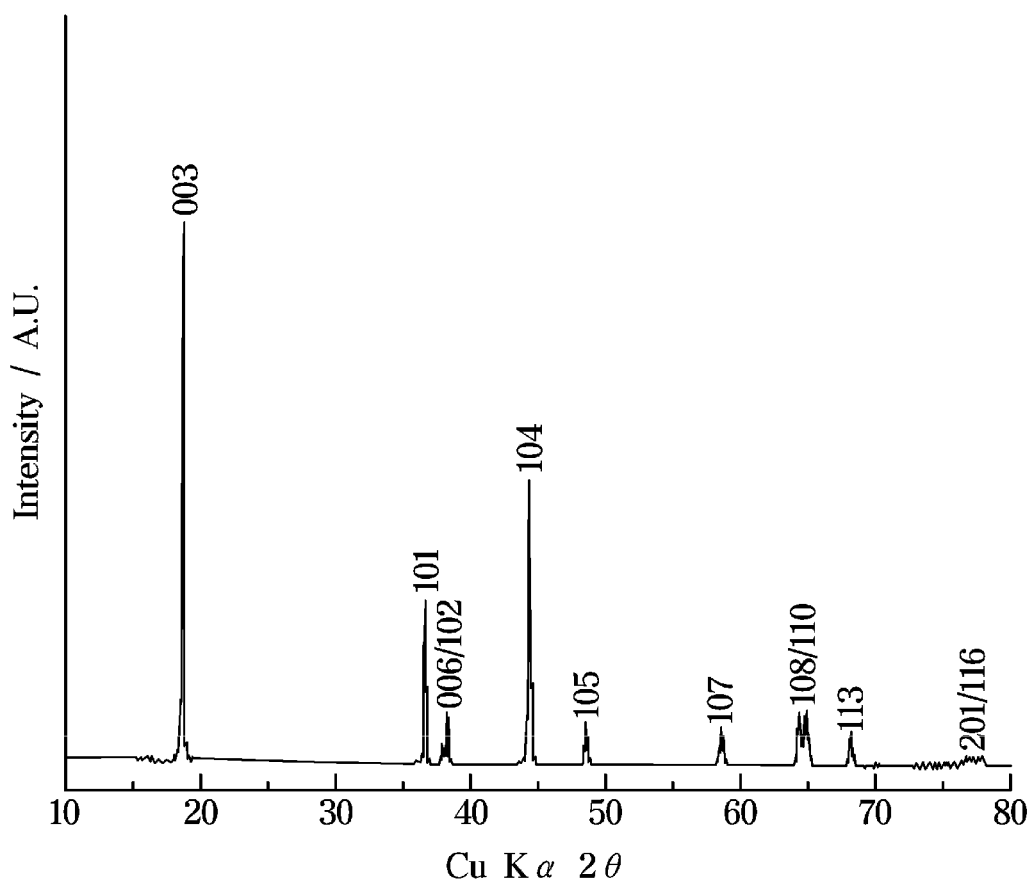
Figure 2C:
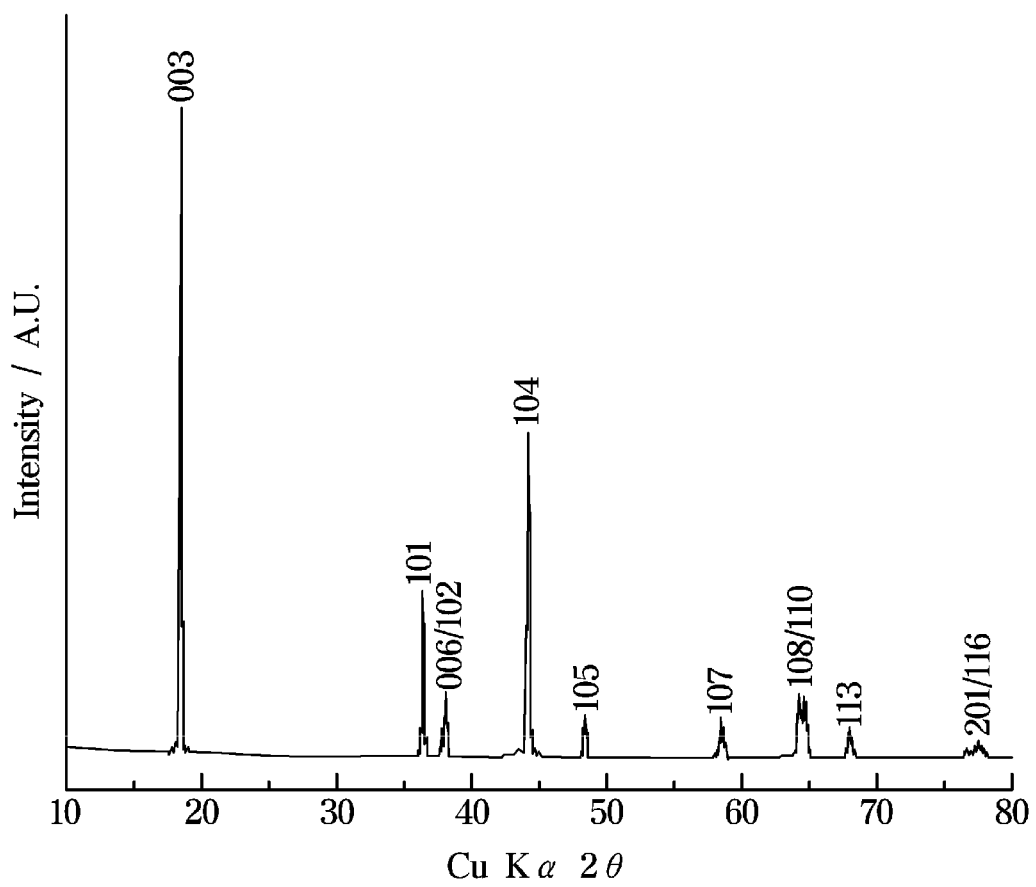

FIGS. 2A, 2B and 2C are XRD graphs of cathode active materials prepared according to Comparative Example 1, Example 1 and Comparative Example 3, respectively. Referring to FIGS. 2A, 2B, and 2C, when the titanium carbide (TiC) was coated on the core, there was almost no changes in the x-axis on the XRD graph, so that the cathode active material for a lithium secondary battery forms a coating layer well without structural distortion. Also, it can be seen that no impurity peaks were formed in the XRD graphs of Examples 1 and Comparative Example 3.

Figure 3A:
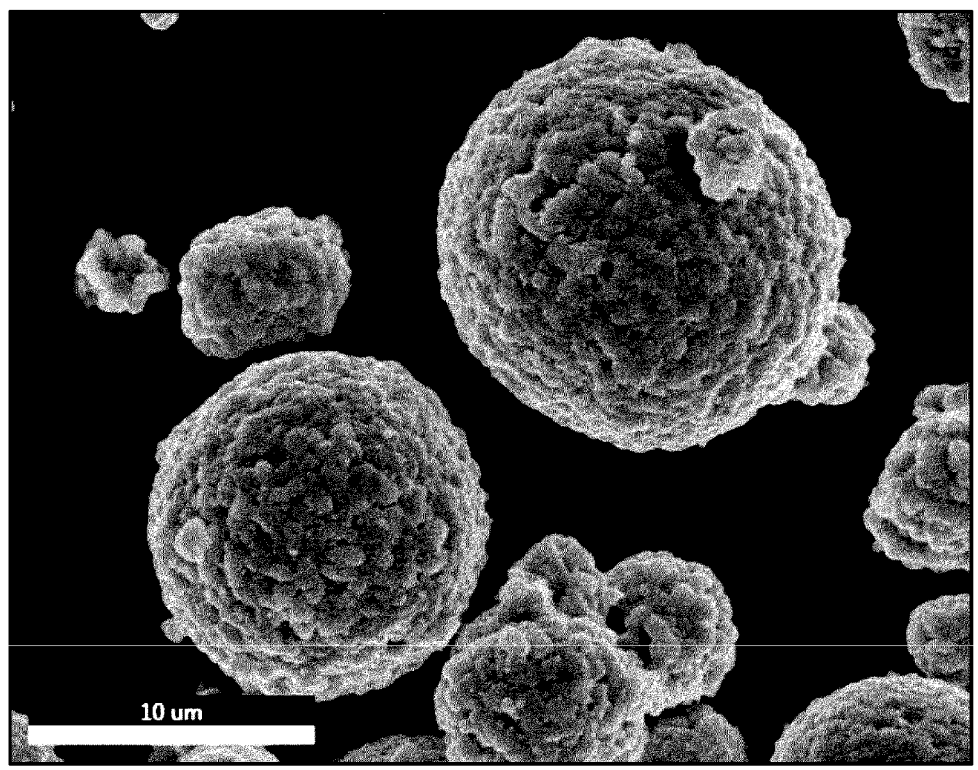
FIGS. 3A, 3B and 3C are scanning electron microscopy—energy dispersive X-ray spectroscopy (SEM-EDX) surface analysis photographs of a cathode active material for a lithium secondary battery according to the present disclosure.
Figure 3B:
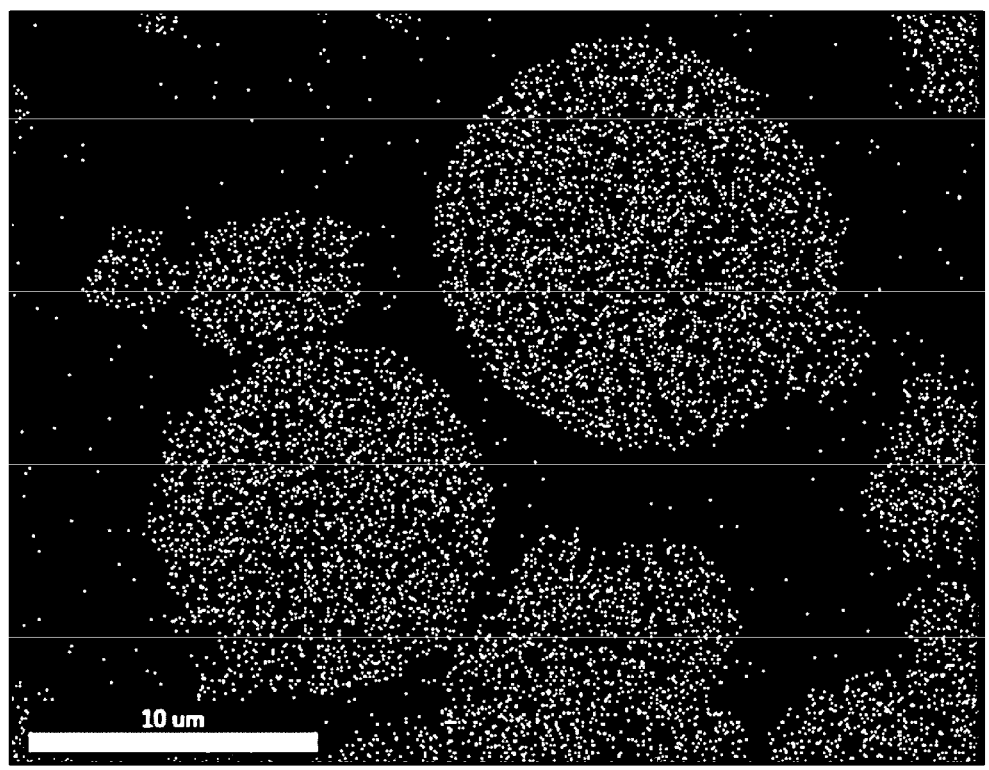
Figure 3C:
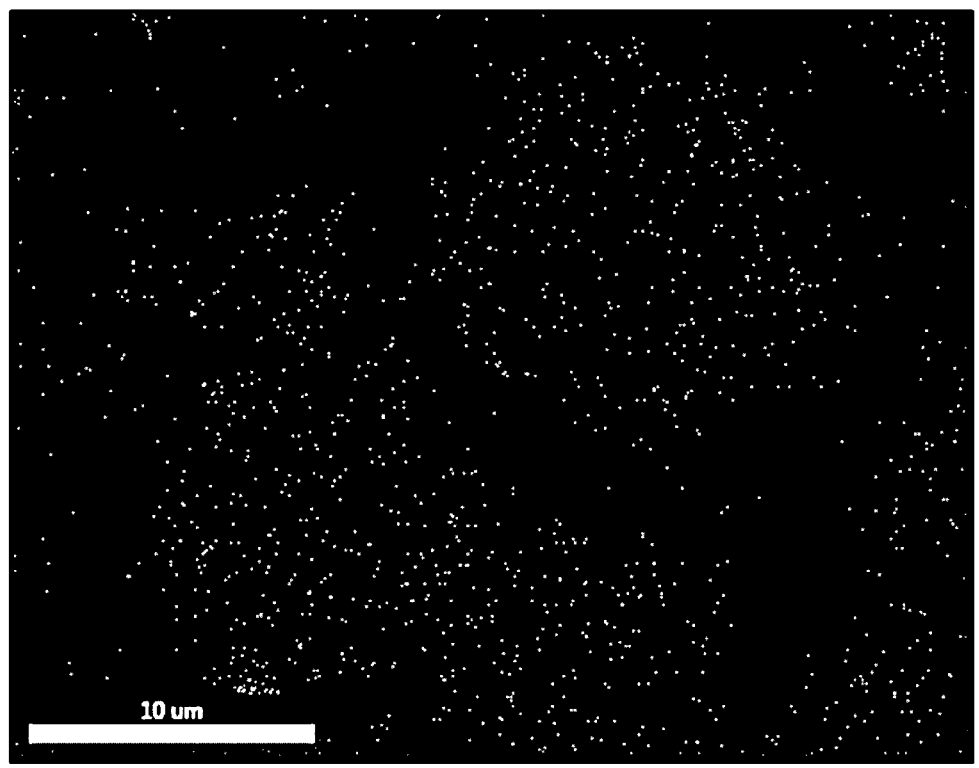

FIGS. 3A, 3B and 3C are SEM-EDX surface analysis photographs of cathode active materials for lithium secondary batteries according to the present disclosure. As shown in FIGS. 3A, 3B, and 3C, since the cathode active material had a spherical shape after coating, it can be seen that the spherical shape was maintained without damaging the particles of the core during the coating process, and titanium carbide (TiC) was uniformly coated on the core.

Figure 4A:
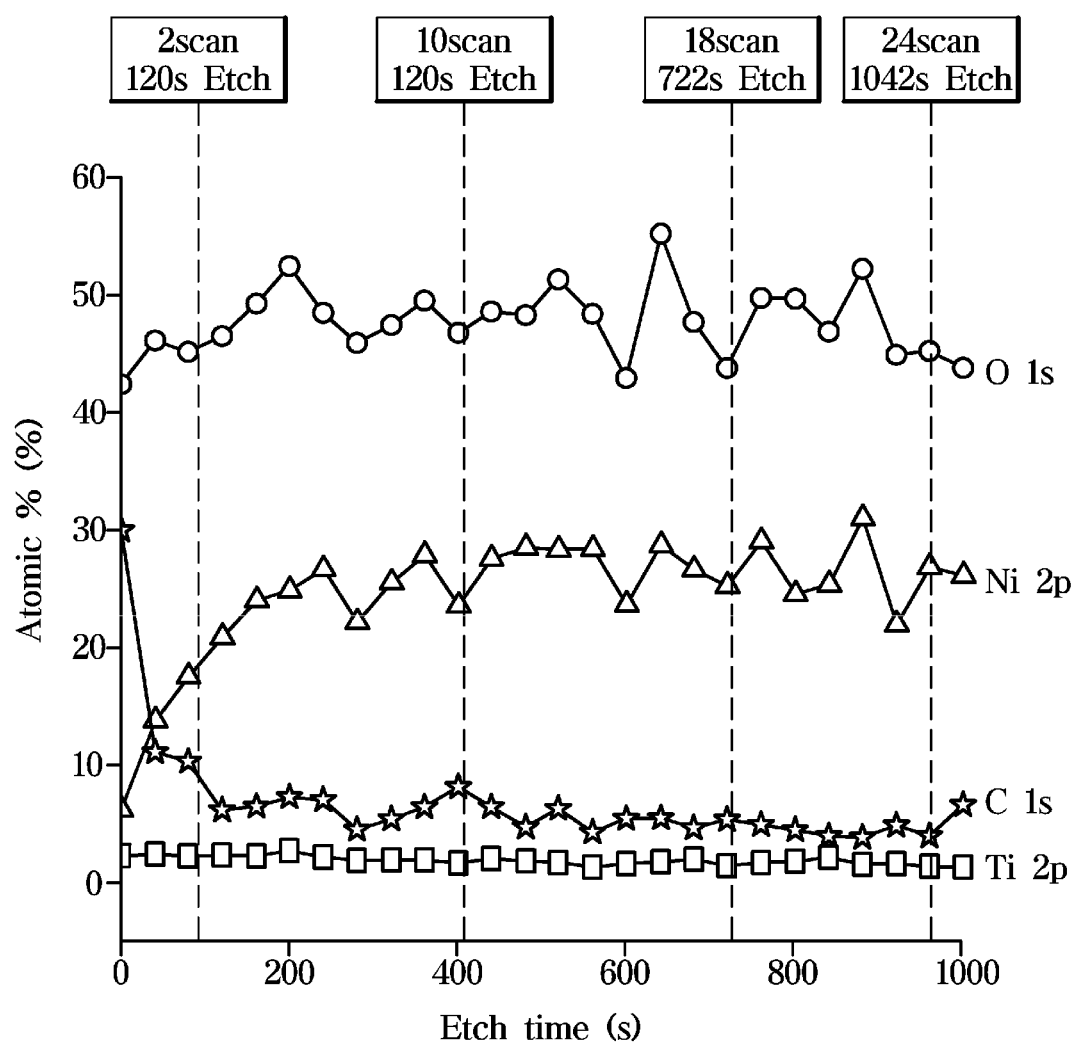
FIGS. 4A and 4B are x-ray photoelectron spectroscopy (XPS) graphs of surface etching analysis of a cathode active material for a lithium secondary battery of the present disclosure.
Figure 4B:
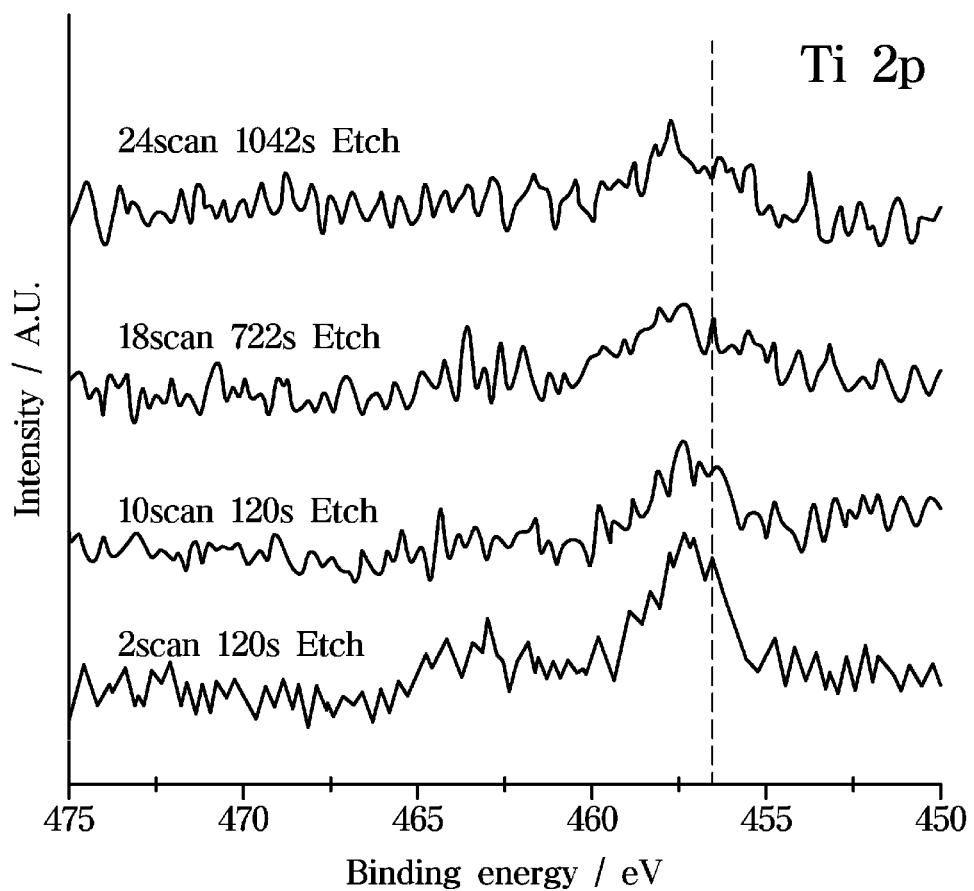

FIGS. 4A and 4B are XPS graphs of surface etching analysis of a cathode active material for a lithium secondary battery of the present disclosure.

Referring to FIGS. 4A and 4B, since the atomic contents (atomic %) of titanium (Ti) and carbon (C) were substantially maintained in accordance with the etching time and the peak at 455 to 457.5 eV due to the surface residual titanium was maintained, it can be seen that titanium carbide (TiC) formed the coating layer well even to and/or in the inner grain boundaries of the core.

Therefore, it can be seen that the cathode active material for a lithium secondary battery of the present disclosure well forms the coating layer on the surface and the inner grain boundaries of the core without structural distortion.

(2) Evaluation of Cell Performance with or without Coating Layer

Figure 5A:
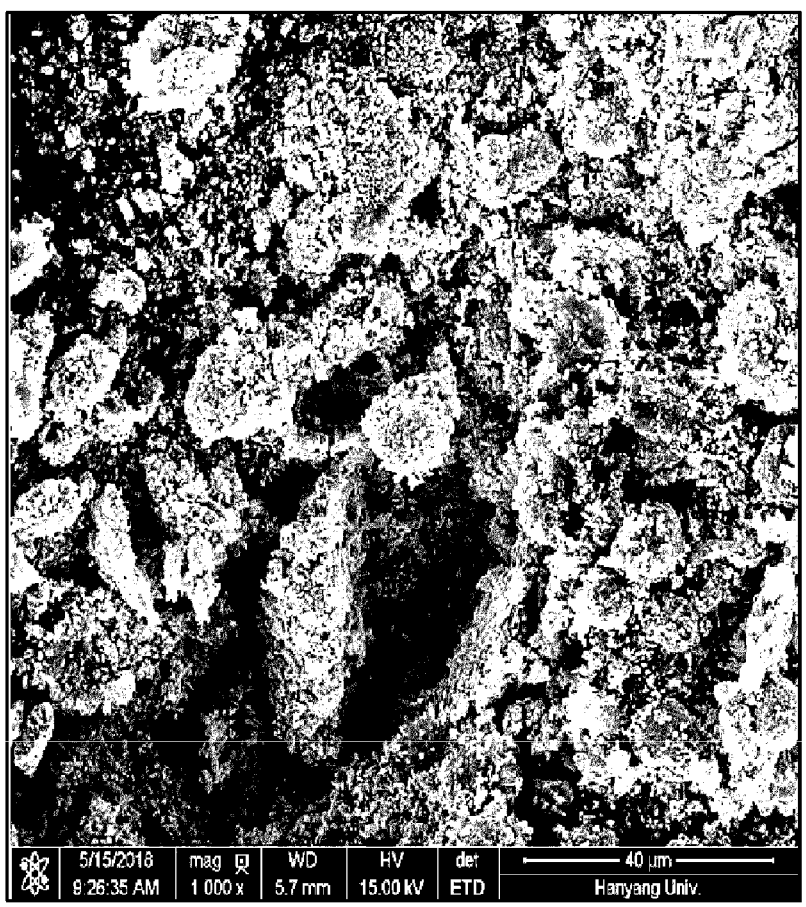
FIGS. 5A and 5B are SEM images for comparing cell performance in the presence and absence of a coating layer.
Figure 5B:
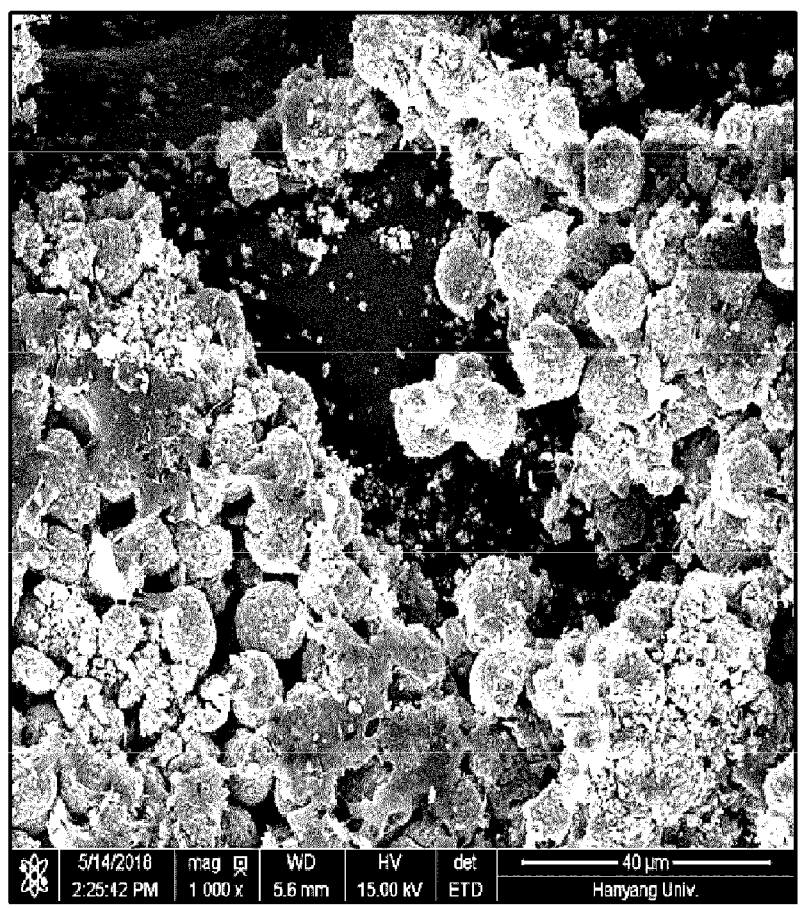

FIGS. 5A and 5B are SEM images of Comparative Example 1 and Example 1 respectively for comparing cell performance with or without a coating layer after the 100$^{th}$ cycle. Referring to FIGS. 5A and 5B, it can be seen that Example 1 well retained the original spherical shape compared to Comparative Example 1, and the surface deterioration was small.

This is because, in the case of Comparative Example 1, cracks were generated due to a sudden change of the lattice due to phase change in repetitive charging and discharging processes, and the electrolyte penetrated into the cracks to cause side reactions between the cathode active material and the electrolyte to increase surface area and deterioration of the surface.

On the other hand, Example 1 exhibited less surface deterioration. Thus, it can be seen that the cathode active material for a lithium secondary battery of the present disclosure forms a coating layer not only on the surface of the core but also on the inner grain boundaries of the core, thereby suppressing side reactions between the cathode active material and the electrolyte so that the lifetime characteristics such as prevention of surface deterioration are improved.

(3) Evaluation of Cell Performance According to Coating Layer Composition

Figure 6:
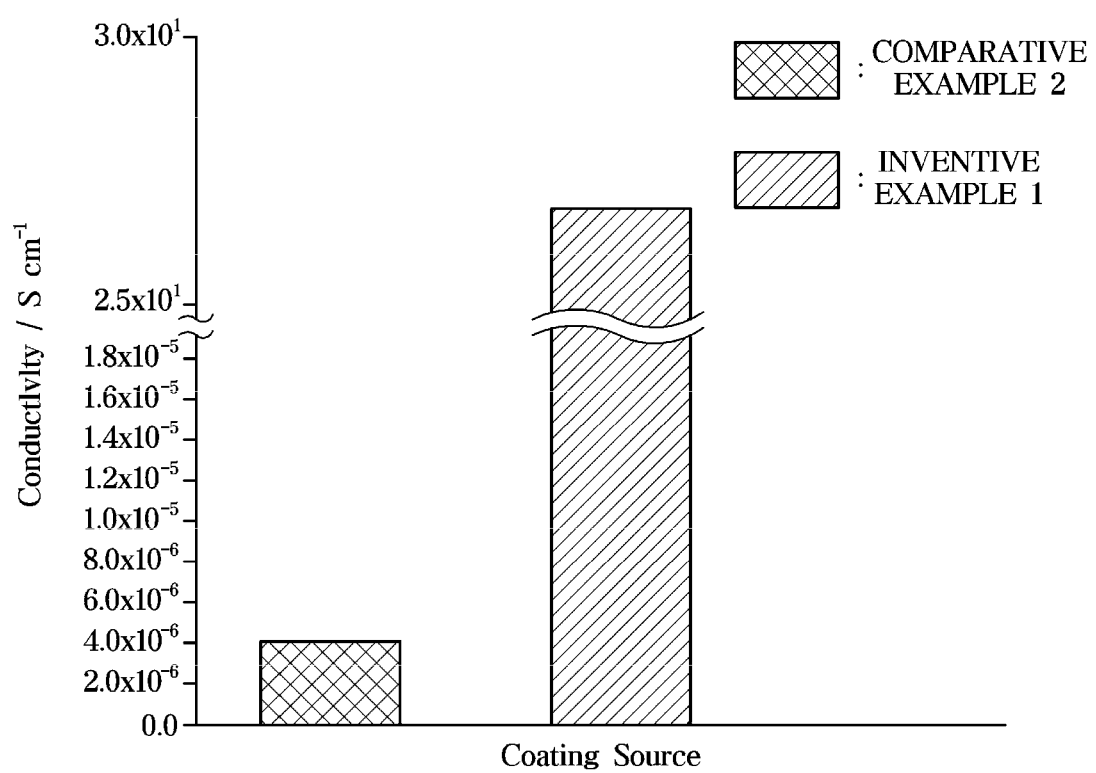
FIG. 6 is a graph of powder conductivity (S/cm) of Example 1 and Comparative Example 2.

The evaluation of the cell performance according to the coating layer composition was evaluated in comparison with Example 1 and Comparative Example 2. FIG. 6 is a graph of powder conductivities (S/cm) of Example 1 and Comparative Example 2. Referring to FIG. 6, the powder conductivity (S/cm) in the case of using titanium carbide (TiC) was significantly higher than that of Comparative Example 2 using titanium oxide (TiO$_2$) to form a coating layer. From this, it can be seen that Example 1 is superior to Comparative Example 2 in powder characteristics.

From the above, it can be seen that forming a coating layer with a metal carbide as in the present disclosure can secure better powder characteristics.

(4) Evaluation of Cell Performance According to Mol % of Metal Carbide

Figure 7:
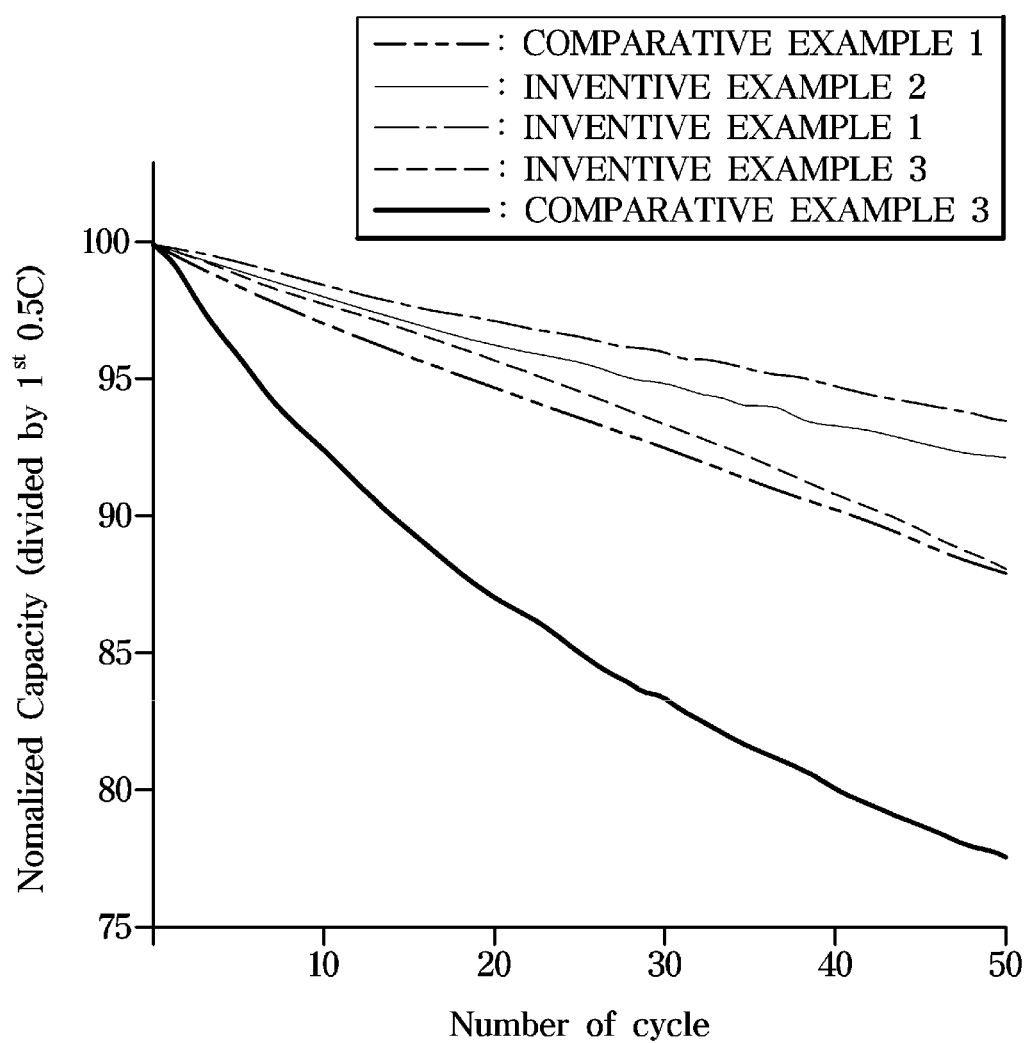
FIG. 7 is a graph showing cell performance according to mol % of a metal carbide.

FIG. 7 is a graph showing cell performance according to mol % of a metal carbide. The measurement results of FIG. 7 are shown in Table 1 below.

TABLE 1

| Sample 1 | TiC (mol %) | 0.5 C, 1$^{st}$ Capacity (mAh/g) | 0.5 C, 50$^{th}$ Capacity Retention (%) |
|---|---|---|---|
| Comparative Example 1 | — | 197.8 | 88.1 |
| Example 2 | 0.5 | 198.8 | 93.1 |
| Example 1 | 1 | 196.2 | 93.8 |
| Example 3 | 2 | 183.8 | 91.2 |
| Comparative Example 3 | 5 | 149.7 | 77.6 |

In Comparative Example 1 in which the coating layer was not formed, the capacity retention ratio after the 50$^{th}$ cycle was 88.1%, which was lower than those of Examples 1, 2 and 3 in which the coating layer was formed. It can be seen that excellent lifetime characteristics can be secured by forming a coating layer.

On the other hand, in Comparative Example 3 in which titanium carbide was added in an amount exceeding 2 mol % (5 mol %), the coating layer was excessively formed, which interfered with the reversible intercalation and deintercalation of lithium and the capacity retention ratio after the 50$^{th}$ cycle was 77.6%, which was lower than those of Examples 1, 2 and 3.

Examples 1, 2 and 3 showed a capacity retention ratio of 91.2% or more with reference to Table 1, indicating excellent lifetime characteristics. Among Examples 1, 2 and 3, Example 1 in which 1 mol % of titanium carbide was added the capacity retention ratio was 93.8%, which was the best lifetime characteristic.

From the above results, in the cathode active material for a lithium secondary battery according to the present disclosure, the coating layer is formed not only on the surface of the core but also on the inner grain boundaries of the core, thereby suppressing side reactions between the cathode active material and the electrolyte.

(5) Evaluation of Cell Performance According to Heating Conditions

Figure 8:
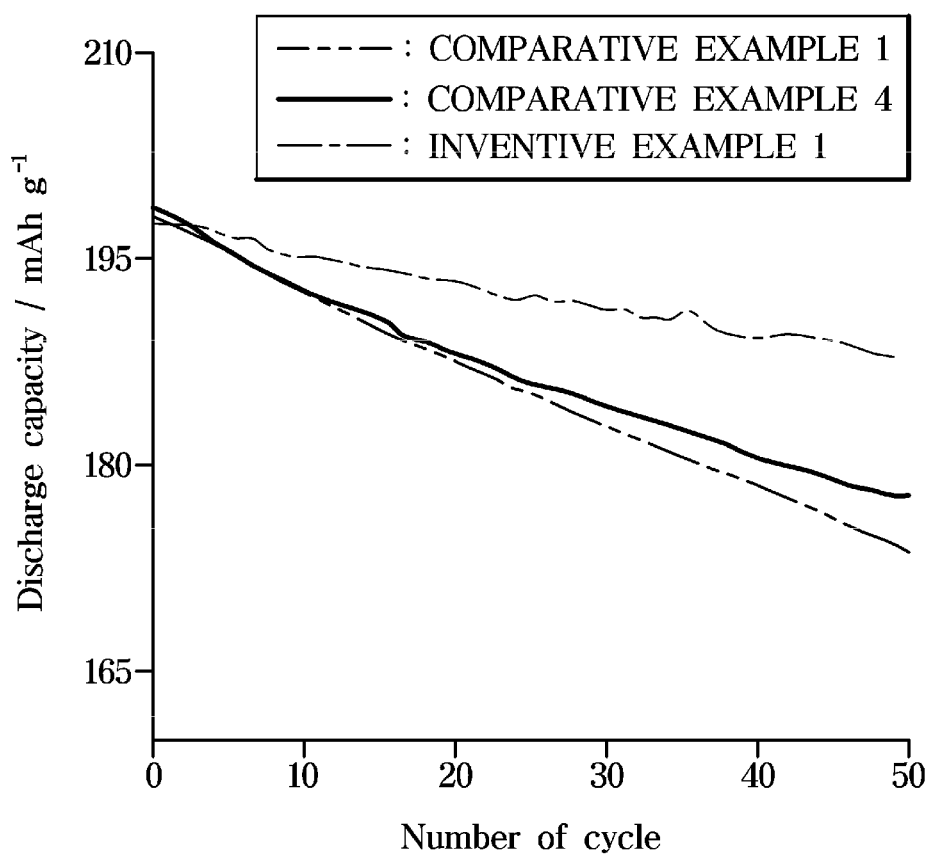
FIG. 8 is a graph showing cell performance according to a heating temperature.

FIG. 8 is a graph showing cell performance according to a heating temperature. The measurement results of FIG. 8 are shown in Table 2 below.

TABLE 2

| Sample | Heating Temperature (° C.) | 0.5 C, 1$^{st}$ Capacity (mAh/g) | 0.5 C, 50$^{th}$ Capacity Retention Ratio (%) |
|---|---|---|---|
| Comparative Example 1 | — | 197.8 | 88.1 |
| Comparative Example 4 | 400 | 198.2 | 89.7 |
| Example 1 | 650 | 197.7 | 95.1 |

In the case of Comparative Example 1 in which no coating layer was formed, the capacity retention ratio after the 50$^{th}$ cycle was 88.1%, which was lower than that of Example 1 in which the coating layer was formed. It can be seen that excellent lifetime characteristics may be secured by forming a coating layer therefrom.

By comparing Example 1 and Comparative Example 4, which were heat-treated at different temperatures, Example 1 heat-treated at a temperature of 600 to 700° C. exhibited a capacity retention rate of 95.1%, which was the optimum lifetime characteristics.

The embodiments disclosed with reference to the accompanying drawings and tables have been described above. It will be understood by those of ordinary skill in the art that various changes in form and details may be made therein without departing from the idea and scope of the present disclosure as defined by the following claims. The disclosed embodiments are illustrative and should not be construed as limiting.

What is claimed is:

1. A cathode active material for a lithium secondary battery comprising:
   a nickel-based cathode active material core comprising a lithium metal oxide, and having inner grain boundaries; and
   a coating layer disposed on a surface and the inner grain boundaries of the nickel-based cathode active material core;
   wherein the coating layer comprises a metal carbide, and the metal carbide is contained in the coating layer in an amount of 0.5 to 2 mol %, and
   the metal carbide comprises a carbide of at least one metal selected from a group consisting of nickel (Ni), cobalt (Co), titanium (Ti), iron (Fe), manganese (Mn), vanadium (V), copper (Cu), zirconium (Zr), zinc (Zn), molybdenum (Mo) and tungsten (W).

2. The cathode active material of claim 1, wherein the lithium metal oxide comprises at least one compound represented by a formula selected from a group consisting of $Li_xMn_{1-y}M'_yA_2$, $Li_xMn_{1-y}M'_yO_{2-z}X_z$, $Li_xMn_2O_{4-z}X_z$, $Li_xMn_{2-y}M'_yA_4$, $Li_xCo_{1-y}M'_yA_2$, $Li_xCo_{1-y}M'_yO_{2-z}X_z$, $Li_xNi_{1-y}M'_yA_2$, $Li_xNi_{1-y}M'_yO_{2-z}X_z$, $Li_xNi_{1-y}Co_yO_{2-z}X_z$, $Li_xNi_{1-y-z}Co_yM'_zA_\alpha$, $Li_xNi_{1-y-z}Co_yM'_zO_{2-\alpha}X_\alpha$, $Li_xNi_{1-y-z}Mn_yM'_zA_\alpha$, and $Li_xNi_{1-y-z}Mn_yM'_zO_{2-\alpha}X_\alpha$ (where $0.95 \leq x \leq 1.1$, $0 \leq y \leq 0.5$, $0 \leq z \leq 0.5$, and $0 < \alpha \leq 2$), wherein, M' is at least one element selected from a group consisting of aluminum (Al), nickel (Ni), cobalt (Co), manganese (Mn), chromium (Cr), iron (Fe), magnesium (Mg), strontium (Sr), vanadium (V), ruthenium (Ru), tin (Sn), titanium (Ti), arsenic (As), molybdenum (Mo) and a rare earth element, A is an element selected from a group consisting of oxygen (O), fluorine (F), sulfur (S) and phosphorous (P), and X is an element selected from a group consisting of fluorine (F), sulfur (S) and phosphorus (P).

3. A lithium secondary battery, comprising:

a cathode comprising a cathode active material comprising a nickel-based cathode active material core comprising a lithium metal oxide and a coating layer disposed on a surface and inner boundaries of the nickel-based cathode active material core, wherein the coating layer comprises a metal carbide, and the metal carbide is contained in the coating layer in an amount of 0.5 to 2 mol % and the metal carbide comprises a carbide of at least one metal selected from a group consisting of nickel (Ni), cobalt (Co), titanium (Ti), iron (Fe), manganese (Mn), vanadium (V), copper (Cu), zirconium (Zr), zinc (Zn), molybdenum (Mo) and tungsten (W);

an anode; and an electrolyte.

4. The cathode active material of claim 1, wherein the metal carbide comprises a carbide of nickel (Ni).

5. The cathode active material of claim 1, wherein the metal carbide comprises a carbide of cobalt (Co).

6. The cathode active material of claim 1, wherein the metal carbide comprises a carbide of titanium (Ti).

7. The cathode active material of claim 1, wherein the metal carbide comprises a carbide of iron (Fe).

8. The cathode active material of claim 1, wherein the metal carbide comprises a carbide of manganese (Mn).

9. The cathode active material of claim 1, wherein the metal carbide comprises a carbide of vanadium (V).

10. The cathode active material of claim 1, wherein the metal carbide comprises a carbide of copper (Cu).

11. The cathode active material of claim 1, wherein the metal carbide comprises a carbide of zirconium (Zr).

12. The cathode active material of claim 1, wherein the metal carbide comprises a carbide of zinc (Zn).

13. The cathode active material of claim 1, wherein the metal carbide comprises a carbide of molybdenum (Mo).

14. The cathode active material of claim 1, wherein the metal carbide comprises a carbide of and tungsten (W).

15. A method of manufacturing the cathode active material for a lithium secondary battery according to claim 1, the method comprising:

dry mixing the metal carbide with the core comprising the lithium metal oxide to prepare a mixture; and forming the metal carbide coating layer on the surface and the inner grain boundaries of the core by heating the mixture.

16. The method of claim 15, wherein the dry mixing comprises at least one selected from a group consisting of a planetary ball mill method, a low speed ball mill method, a high speed ball mill method, a hybridization method and a mechanofusion method.

17. The method of claim 15, wherein the metal carbide is contained in the coating layer in an amount of 0.5 to 2 mol %.

18. The method of claim 15, wherein a temperature for the heating is 600 to 700° C.

* * * * *